US012287696B1

(12) United States Patent
Verma et al.

(10) Patent No.: US 12,287,696 B1
(45) Date of Patent: Apr. 29, 2025

(54) DYNAMICALLY ADJUSTING OBSERVABILITY BASED ON REAL-TIME PERFORMANCE

(71) Applicant: International Business Machines Corporation, Armonk, NY (US)

(72) Inventors: Mudit Verma, New Delhi (IN); Harshit Kumar, Delhi (IN); Seep Goel, Bengaluru (IN); Pooja Aggarwal, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 18/377,709

(22) Filed: Oct. 6, 2023

(51) Int. Cl.
*G06F 11/00* (2006.01)

(52) U.S. Cl.
CPC ...... *G06F 11/008* (2013.01); *G06F 2201/865* (2013.01)

(58) Field of Classification Search
CPC .......................... G06F 11/008; G06F 2201/865
See application file for complete search history.

(56) References Cited

U.S. PATENT DOCUMENTS

| | | | | |
|---|---|---|---|---|
| 10,776,194 | B2 * | 9/2020 | Bath | G06F 16/24564 |
| 11,321,217 | B1 * | 5/2022 | Agarwal | G06F 11/302 |
| 11,513,930 | B2 * | 11/2022 | Chan | G06F 11/3476 |
| 11,561,849 | B1 * | 1/2023 | Kairali | G06F 11/079 |
| 11,599,404 | B2 * | 3/2023 | Chan | G06F 16/245 |
| 11,765,043 | B2 * | 9/2023 | Gamliel | H04L 41/145 |
| | | | | 709/223 |
| 11,968,086 | B1 * | 4/2024 | Shpilyuck | H04L 41/082 |
| 12,026,036 | B2 * | 7/2024 | Huang | G06F 11/3476 |
| 2021/0081800 | A1 | 3/2021 | Zhang et al. | |
| 2022/0141304 | A1 * | 5/2022 | Gefen | H04L 67/567 |
| | | | | 709/219 |
| 2022/0171689 | A1 * | 6/2022 | Barnsteiner | H04L 41/5009 |
| 2022/0172037 | A1 | 6/2022 | Kang et al. | |
| 2023/0077240 | A1 * | 3/2023 | Sawazaki | H04L 47/122 |
| 2024/0160504 | A1 * | 5/2024 | Seshadri | G06F 11/302 |
| 2024/0176688 | A1 * | 5/2024 | Huang | G06F 11/0712 |

OTHER PUBLICATIONS

Levin, J., "ViperProbe: Using eBPF Metrics to Improve Microservice Observability," Brown University Computer Science Honors Thesis, May 2020, pp. 1-15.
Anonymous, "Automated Discovery and Inventory Using a Service Mesh Implementation," IP.com Prior Art Database, Technical Disclosure No. IPCOM000267363D, Oct. 21, 2021, 5 pages.

(Continued)

*Primary Examiner* — Amine Riad
(74) *Attorney, Agent, or Firm* — Zilka-Kotab, P.C.

(57) ABSTRACT

A computer-implemented method, according to one approach, includes: receiving observability data produced by a first portion of a distributed application. The observability data is evaluated and in response to determining that the observability data indicates the first portion of the distributed application is degraded, the amount of the observability data produced by the first portion of the distributed application is increased. Additionally, the amount of observability data produced by other portions of the distributed application that are correlated with the first portion of the distributed application is also increased.

25 Claims, 8 Drawing Sheets

(56) References Cited

OTHER PUBLICATIONS

Mendelovich, L., "Logging impact application performance," Cisco Tech Blog, Jan. 12, 2022, 5 pages, retrieved from https://techblog.cisco.com/blog/logging-impact-on-application-performance.

Uber Blog, "Reducing Logging Cost by Two Orders of Magnitude using CLP," Uber Blog, Engineering, Sep. 29, 2022, 19 pages, retrieved from https://www.uber.com/blog/reducing-logging-cost-by-two-orders-of-magnitude-using-clp/.

IBM, "Watson AIOps component overview," IBM Watson AIOps, Feb. 9, 2022, 3 pages, retrieved from https://www.ibm.com/docs/en/watson-aiops/2.1?topic=overview-component.

* cited by examiner

DYNAMICALLY ADJUSTING OBSERVABILITY BASED ON REAL-TIME PERFORMANCE

BACKGROUND

The present invention relates to interpreting data production, and more specifically, this invention relates to dynamically adjusting observability data production and/or evaluation based on real-time performance characteristics.

The prevalence of computer systems has increased with the advancement of the Internet, and wireless network standards such as Bluetooth and Wi-Fi. Additionally, the adoption and development of smart devices, e.g., such as smartphones, televisions, tablets, and other devices in the Internet of Things (IoT) has increased as processing power and functionality improve.

Data production continues to increase as computing power advances. For instance, the rise of smart enterprise endpoints has led to large amounts of data being generated at remote locations. Data production will only further increase with the growth of 5G networks and an increased number of connected mobile devices.

Data observability refers to a comprehensive understanding of the health and performance of the data that is produced by a given system. Data observability tools employ automated monitoring, root cause analysis, data lineage, and data health insights to proactively detect, resolve, and prevent anomalies by evaluating observability data. It follows that "observability data" refers to information that is received and evaluated to determine performance characteristics of a source of the observability data. Observability data thereby plays a role in ensuring the smooth functioning of software. Continuous monitoring has thereby served as a key aspect of observability in conventional products that enables developers to identify and address issues in real-time.

However, as data production continues to increase, so does the overhead associated with processing the larger amounts of data. In other words, with the increasing complexity of modern applications, especially those based on microservices architectures, the amount of operations data, including logs, metrics, traces, etc., that is generated by these systems has significantly increased.

SUMMARY

A computer-implemented method, according to one approach, includes: receiving observability data produced by a first portion of a distributed application. The observability data is evaluated and in response to determining that the observability data indicates the first portion of the distributed application is degraded, the amount of observability data produced by the first portion of the distributed application is increased. Additionally, the amount of observability data produced by other portions of the distributed application that are correlated with the first portion of the distributed application is also increased.

A computer program product, according to another approach, includes a computer readable storage medium having program instructions embodied therewith. The program instructions are readable by a processor, executable by the processor, or readable and executable by the processor, to cause the processor to: perform the foregoing method.

A system, according to yet another approach, includes: a processor, as well as logic that is integrated with the processor, executable by the processor, or integrated with and executable by the processor. Moreover, the logic is configured to: perform the foregoing method.

A computer-implemented method, according to another approach, includes: receiving observability data associated with a first portion of a distributed application. In some instances, the received observability data indicates the first portion of the distributed application is degraded. Accordingly, a complete version of observability data produced by the first portion of the distributed application may also be received. Other portions of the distributed application that are correlated with the first portion of the distributed application are further identified and the amount of observability data produced by each of the identified other portions of the distributed application is increased.

A computer program product, according to still another approach, includes a computer readable storage medium having program instructions embodied therewith. The program instructions are readable by a processor, executable by the processor, or readable and executable by the processor, to cause the processor to: perform the method above.

Other aspects and implementations of the present invention will become apparent from the following detailed description, which, when taken in conjunction with the drawings, illustrate by way of example the principles of the invention.

DETAILED DESCRIPTION

Figure 1:
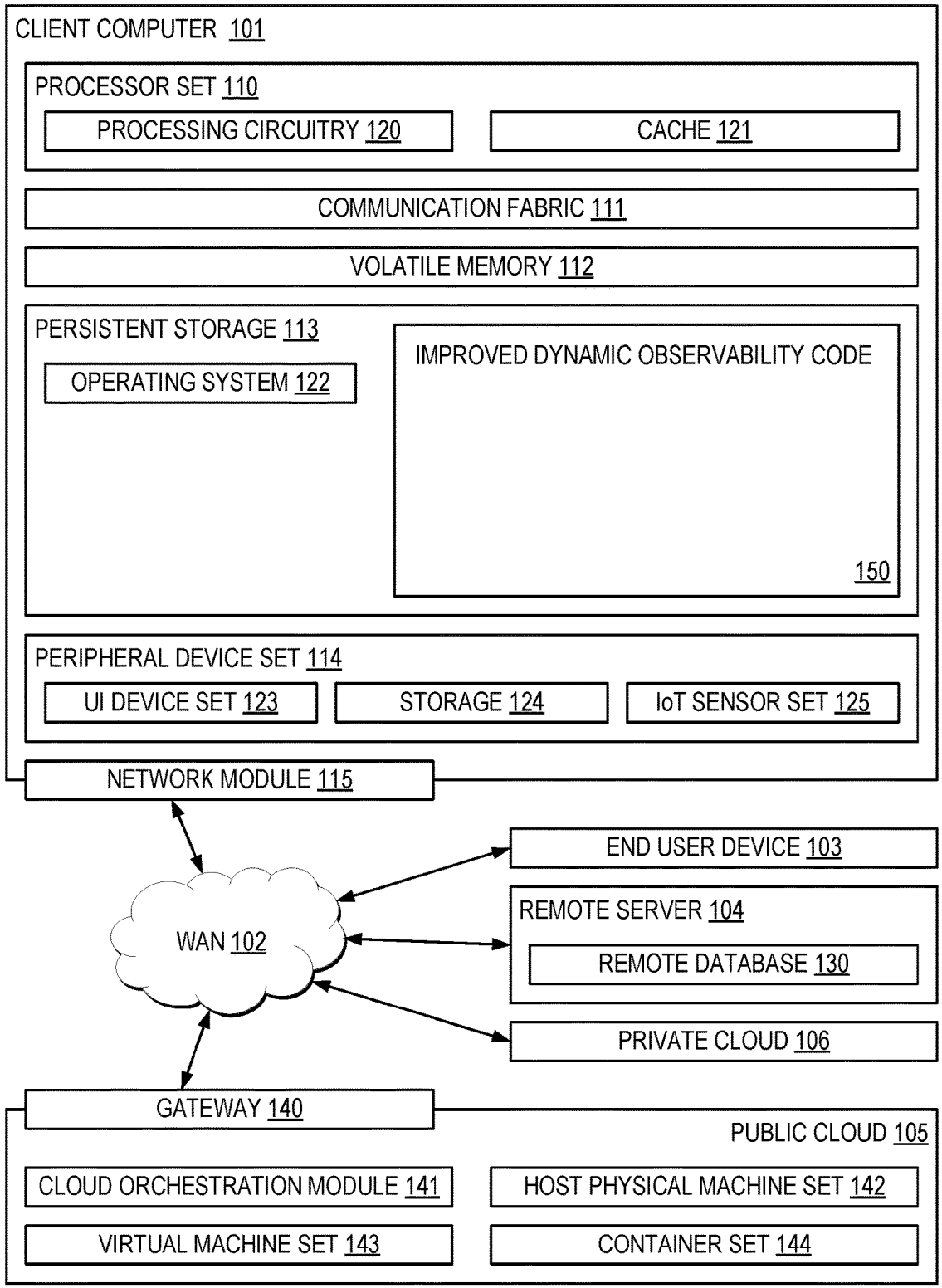
FIG. 1 is a diagram of a computing environment, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for dynamically adjusting the amount of observability data that is evaluated and/or produced by distributed applications based on real-time performance characteristics of the distributed applications themselves. Implementations herein are thereby able to decrease stress to distributed applications and/or system infrastructure caused by the generation and processing of observability data. Moreover, this reduced stress does not negatively impact the ability to perform effective monitoring of application performance in real-time. For instance, implementations herein are desirably able to provide sufficient observability data to conduct downstream operations, while also reducing overhead associated with data generation, processing, and storage, e.g., as will be described in further detail below.

In one general approach, a computer-implemented method includes: receiving observability data produced by a first portion of a distributed application. The observability data is evaluated and in response to determining that the observability data indicates the first portion of the distributed application is degraded, the amount of the observability data produced by the first portion of the distributed application is increased. Additionally, the amount of observability data produced by other portions of the distributed application that are correlated with the first portion of the distributed application is also increased.

It follows that implementations herein are able to dynamically adjust the amount of observability data that is evaluated and/or produced by distributed applications based on real-time performance characteristics of the distributed applications themselves. For instance, some approaches are able to dynamically increase the amount of observability data being produced and/or evaluated in response to identifying a high risk situation. The amount of observability data produced and/or evaluated may further be reduced in low risk situations. Implementations herein are thereby able to dynamically adjust the resources that are consumed by the data observability process to ensure the distributed application operates as desired. In other words, implementations are able to significantly improve the efficiency by which a distributed application may be maintained.

In some implementations, the process of causing the amount of observability data produced by the other portions of the distributed application to increase includes: evaluating a topological relationship between the portions of the distributed application, and identifying a subset of the portions of the distributed application that are within a predetermined distance from the degraded first portion of the distributed application. Moreover, the amount of observability data produced by the portions of the distributed application in the identified subset is increased.

Again, implementations herein are thereby able to dynamically adjust the resources that are consumed by the data observability process to ensure the distributed application operates as desired. In other words, implementations are able to significantly improve the efficiency by which a distributed application may be maintained.

In some implementations, each of the portions of the distributed application are microservices. The topological relationship may thereby outline how the microservices interact with each other. Causing the amount of observability data produced by the portions of the distributed application in the identified subset to increase may thereby include sending instructions to microcontrollers correlated with the portions of the distributed application in the identified subset. Those instructions may thereby cause the microcontrollers to increase the amount of observability data produced by each of the distributed applications in the identified subset.

Again, dynamically increasing the amount of observability data that is being produced and/or evaluated in high risk situations allows for better functionality for microservices. Moreover, by identifying other microservices that have a relationship with (e.g., receive outputs from) microservices increasing observability data production, data production can be increased for those other microservices as well. Implementations herein are thereby able to significantly improve the efficiency by which a distributed application may be maintained in a number of different situations.

In some implementations, a majority of observability data that is received is discarded in response to determining that a microservice is not degraded. In other words, only a minority of the originally received observability data is maintained in situations where the microservice is operating nominally. The amount of the observability data produced by the first portion of the distributed application may also be decreased in response to determining that a microservice is not degraded. Again, by reducing the amount of data (e.g., observability data) that is evaluated during periods of low risk, implementations herein are able to reduce compute overhead, thereby leading to improved performance.

In another general approach, a computer program product includes a computer readable storage medium having program instructions embodied therewith. The program instructions are readable by a processor, executable by the processor, or readable and executable by the processor, to cause the processor to: perform the foregoing method.

In yet another general approach, a system includes: a processor, as well as logic that is integrated with the processor, executable by the processor, or integrated with and executable by the processor. Moreover, the logic is configured to: perform the foregoing method.

In another general approach, a computer-implemented method, according to another approach, includes: receiving observability data associated with a first portion of a distributed application. In some instances, the received observability data indicates the first portion of the distributed application is degraded. Accordingly, a complete version of observability data produced by the first portion of the distributed application may also be received. Other portions of the distributed application that are correlated with the first portion of the distributed application are further identified and the amount of observability data produced by each of the identified other portions of the distributed application is increased.

Again, implementations herein are able to dynamically adjust the amount of observability data that is evaluated and/or produced by distributed applications based on real-time performance characteristics of the distributed applications themselves. Accordingly, an appropriate amount of performance characteristics (e.g., observability data) is evaluated to maintain operation. In other words, implementations are able to significantly improve the efficiency by which a distributed application may be maintained.

In some implementations, identifying the other portions of the distributed application that are correlated with the first portion of the distributed application, includes: evaluating a topological relationship between the portions of the distributed application. Based at least in part on the evaluation, a subset of the portions of the distributed application that are within a predetermined distance from the degraded first portion of the distributed application are identified.

Again, implementations herein are thereby able to dynamically adjust the resources that are consumed by the data observability process to ensure the distributed application operates as desired. In other words, implementations are able to significantly improve the efficiency by which a distributed application may be maintained.

In some implementations, increasing the amount of observability data produced by the identified other portions of the distributed application, includes: sending one or more instructions to each portion of the distributed application in the identified subset, the one or more instructions causing the amount of observability data produced by the respective portion in the identified subset to increase. Moreover, each portion of the distributed application may be a microservice, such that the topological relationship outlines how the microservices interact with each other. A processing engine that is coupled to each of the portions of the distributed application may thereby send the one or more instructions.

Again, dynamically increasing the amount of observability data that is being produced and/or evaluated in high risk situations allows for better functionality for microservices. Moreover, by identifying other microservices that have a relationship with (e.g., receive outputs from) microservices that are increasing observability data production, data production can be increased for those other microservices as well. Implementations herein are thereby able to significantly improve the efficiency by which a distributed application may be maintained.

In another implementation, a condensed version of observability data from the first portion is received in response to identifying that the first portion of the distributed application is not degraded. Additionally, the amount of observability data produced by the identified other portions of the distributed application is decreased in response to determining that a microservice is not degraded. Again, by reducing the amount of data (e.g., observability data) that is evaluated during periods of low risk, implementations herein are able to reduce compute overhead, thereby leading to improved performance.

In still another general approach, a computer program product includes a computer readable storage medium having program instructions embodied therewith. The program instructions are readable by a processor, executable by the processor, or readable and executable by the processor, to cause the processor to: perform the method above.

Various aspects of the present disclosure are described by narrative text, flowcharts, block diagrams of computer systems and/or block diagrams of the machine logic included in computer program product (CPP) implementations. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product (CPP) is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved dynamic observability code at block 150 for dynamically adjusting the amount of observability data that is evaluated and/or produced by distributed applications based on real-time performance characteristics of the distributed applications themselves. In addition to block 150, computing environment 100 includes, for example, computer 101, wide area network (WAN) 102, end user device (EUD) 103, remote server 104, public cloud 105, and private cloud 106. In this implementation, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and IoT sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various implementations, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some implementations, storage 124 may take the form of a quantum computing storage device for storing data in the form of qubits. In implementations where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some implementations, network control functions and network forwarding functions of network module 115 are performed on the same physical hardware device. In other implementations (for example, implementations that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some implementations, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some implementations, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other implementations a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this implementation, public cloud 105 and private cloud 106 are both part of a larger hybrid cloud.

In some aspects, a system according to various implementations may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various implementations.

As noted above, the prevalence of computer systems has increased with the advancement of the Internet, and wireless network standards such as Bluetooth and Wi-Fi. Additionally, the adoption and development of smart devices, e.g., such as smartphones, televisions, tablets, and other devices in the IoT has increased as processing power and functionality improve. Data production continues to increase as computing power advances. For instance, the rise of smart enterprise endpoints has led to large amounts of data being generated at remote locations. Data production will only further increase with the growth of 5G networks and an increased number of connected mobile devices.

Data observability refers to a comprehensive understanding of the health and performance of the data that is produced by a given system. Data observability tools employ automated monitoring, root cause analysis, data lineage, and data health insights to proactively detect, resolve, and prevent anomalies by evaluating observability data. It follows that "observability data" refers to information that is received and evaluated to determine performance characteristics of a source of the observability data. Observability data thereby plays a vital role in ensuring the smooth functioning of software (e.g., an application). Continuous monitoring has thereby served as a key aspect of observability in conventional products that enables developers to identify and address issues in real-time.

However, as data production continues to increase, so does the overhead associated with processing the larger amounts of data. In other words, with the increasing complexity of modern applications, especially those based on microservices architectures, the amount of operations data, including logs, metrics, traces, etc., that is generated by these systems has significantly increased.

Increased data production results in increased storage costs. For example, log files can quickly accumulate and take up a significant amount of storage space, which can result in increased cloud storage costs. Sending log data to a cloud location can also result in increased network costs as well as data transfer costs. Further still, costs associated with actually processing (e.g., evaluating) larger amounts of data introduces additional costs. For instance, processing large log data collections consumes computational resources, which can be expensive, especially for real-time processing. The cost of log processing can increase significantly in multi-cloud environments, where data is generated across multiple clouds, services, and applications. As the amount of data grows, the cost of processing and analyzing the data also increases, requiring more computational resources and resulting in higher costs.

It follows that the collection, storage, and maintenance of observability data has come at a considerable cost to conventional products, both in terms of resources and finances. Moreover, observability data is often unstructured and complex, making data searching and evaluation highly inefficient in these conventional products. Observability pipelines have also posed challenges in conventional products when dealing with performance-sensitive applications, as they can potentially interfere with application data paths. Therefore, conventional products have been forced to choose between experiencing degraded observability and slower application performance. This is especially true for resource constrained environments (e.g., such as edge nodes) and performance sensitive workloads.

Conventional systems have thereby suffered from significant operational and performance based inefficiencies. In sharp contrast to these conventional shortcomings, implementations herein are able to dynamically adjust the amount of observability data that is evaluated and/or produced by distributed applications to produce real-time performance characteristics of the distributed applications themselves. For instance, some approaches are able to dynamically increase the amount of observability data being produced and/or evaluated in response to identifying a high risk situation. The amount of observability data produced and/or evaluated may further be reduced in low risk situations. Implementations herein are thereby able to significantly improve the efficiency with which a distributed application may be maintained, e.g., as will be described in further detail below.

Figure 2A:
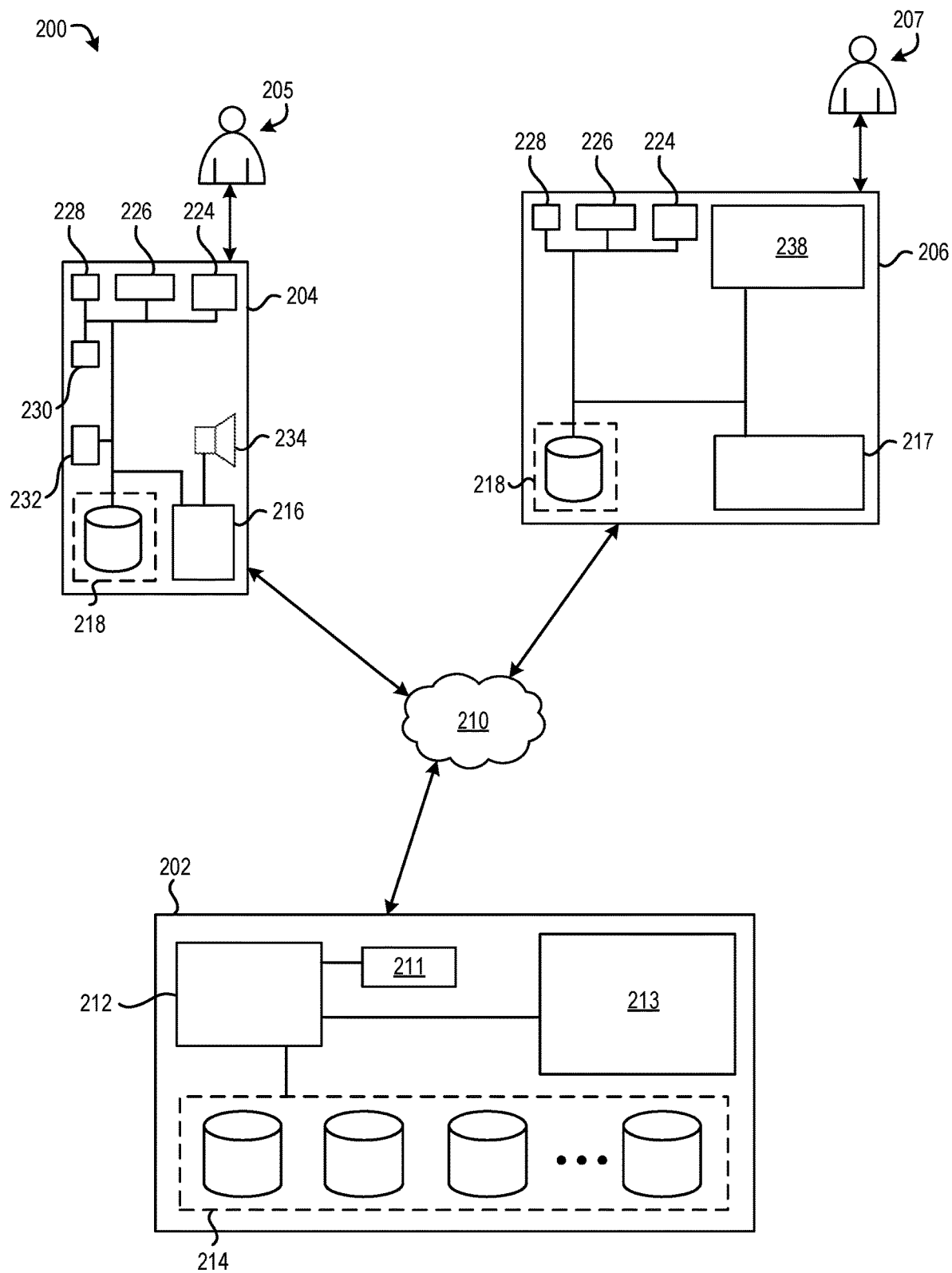
FIG. 2A is a representational view of a distributed system, in accordance with one approach.

Looking now to FIG. 2A, a system 200 having a distributed architecture is illustrated in accordance with one approach. As an option, the present system 200 may be implemented in conjunction with features from any other approach listed herein, such as those described with reference to the other FIGS., such as FIG. 1. However, such system 200 and others presented herein may be used in various applications and/or in permutations which may or may not be specifically described in the illustrative approaches or implementations listed herein. Further, the system 200 presented herein may be used in any desired environment. Thus FIG. 2A (and the other FIGS.) may be deemed to include any possible permutation.

As shown, the system 200 includes a central server 202 that is connected to a user device 204, and edge node 206 accessible to the user 205 and administrator 207, respectively. The central server 202, user device 204, and edge node 206 are each connected to a network 210, and may thereby be positioned in different geographical locations. The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, an internal telephone network, etc. As a result, any desired information, data, commands, instructions, responses, requests, etc. may be sent between user device 204, edge node 206, and/or central server 202, regardless of the amount of separation which exists therebetween, e.g., despite being positioned at different geographical locations.

However, it should be noted that two or more of the user device 204, edge node 206, and central server 202 may be connected differently depending on the approach. According to an example, which is in no way intended to limit the invention, two servers (e.g., nodes) may be located relatively close to each other and connected by a wired connection, e.g., a cable, a fiber-optic link, a wire, etc., or any other type of connection which would be apparent to one skilled in the art after reading the present description.

The terms "user" and "administrator" are in no way intended to be limiting either. For instance, while users and administrators may be described as being individuals in various implementations herein, a user and/or an administrator may be an application, an organization, a preset process, etc. The use of "observability data" and "information" herein is in no way intended to be limiting either, and may include any desired type of details, e.g., depending on the type of operating system implemented on the user device 204, edge node 206, and/or central server 202.

For example, video data, audio data, sensor data, images, etc. may be sent to a processing engine in the central server 202 from user device 204 and/or edge node 206 for processing using one or more machine learning models. According to another example, each portion (e.g., microservices) of a distributed application may be performed at a different one of the locations in the system 200. In other words, a first microservice associated with a distributed application may be performed by processor 216 in user device 204, a second microservice associated with the same distributed application may be performed by controller 217 in edge node 206, and a third microservice associated with the distributed application may be performed by machine learning module 213 and/or processor 212 in central server 202, e.g., as will be described in further detail below.

With continued reference to FIG. 2A, the central server 202 includes a large (e.g., robust) processor 212 coupled to a cache 211, a machine learning module 213, and a data storage array 214 having a relatively high storage capacity. The machine learning module 213 may include any desired number and/or type of machine learning models. In preferred approaches, the machine learning module 213 and/or processor 212 include one or more machine learning models that have been trained to evaluate observability data associated with a distributed application, and determine a status of the distributed application.

For instance, the machine learning models are preferably trained to evaluate observability data generated by a microservice (e.g., "portion") of the distributed application and determine whether the microservice is degraded or not. Implementations herein can thereby adjust the amount of observability data produced and evaluated, based on the status of the distributed application. In other words, implementations are able to dynamically adjust the resources that are consumed by the data observability process to ensure the distributed application operates as desired, e.g., as will be described in further detail below.

Looking to user device 204, a processor 216 coupled to memory 218 receives inputs from and interfaces with user 205. For instance, the user 205 may input information using one or more of: a display screen 224, keys of a computer keyboard 226, a computer mouse 228, a microphone 230, and a camera 232. The processor 216 may thereby be configured to receive inputs (e.g., text, sounds, images, motion data, etc.) from any of these components as entered by the user 205. These inputs typically correspond to information presented on the display screen 224 while the entries were received. Moreover, the inputs received from the keyboard 226 and computer mouse 228 may impact the information shown on display screen 224, data stored in memory 218, information collected from the microphone 230 and/or camera 232, status of an operating system being implemented by processor 216, etc. The electronic device 204 also includes a speaker 234 which may be used to play (e.g., project) audio signals for the user 205 to hear.

Looking now to the edge node 206 of FIG. 2A, some of the components included therein may be the same or similar to those included in user device 204, some of which have been given corresponding numbering. For instance, controller 217 is coupled to memory 218, a display screen 224, keys of a computer keyboard 226, and a computer mouse 228. Additionally, the controller 217 is coupled to a machine learning module 238. As described above with respect to machine learning module 213, the machine learning module 238 may include any desired number and/or type of machine learning models. It follows that machine learning module 238 may implement similar, the same, or different characteristics as machine learning module 213 in central server 202.

As noted above, distributed systems like system 200 of FIG. 2A are able to perform different portions of a distributed application in parallel at different locations. In other words, a first microservice associated with a distributed application may be performed by processor 216 in user device 204, a second microservice associated with the same distributed application may be performed by controller 217 in edge node 206, and a third microservice associated with the distributed application may be performed by machine learning module 213 and/or processor 212 in central server 202. While each microservice may be performed at a different location to increase throughput, observability data associated with the distributed application is also produced at each of these locations.

Monitoring performance of the various microservices allows for observability data production to be dynamically adjusted to account for changes in performance. For instance, greater amounts of observability data is collected in situations involving heightened evaluation, e.g., such as when a deviation from expected behavior or problem is detected, while smaller amounts of observability data is collected in nominal situations. Implementations herein are thereby able to monitor performance, and implement self-adjusting observability data generation. This is particularly true for approaches involving a multi-component distributed application, where problems detected in one component might cascade to other components.

Figure 2B:
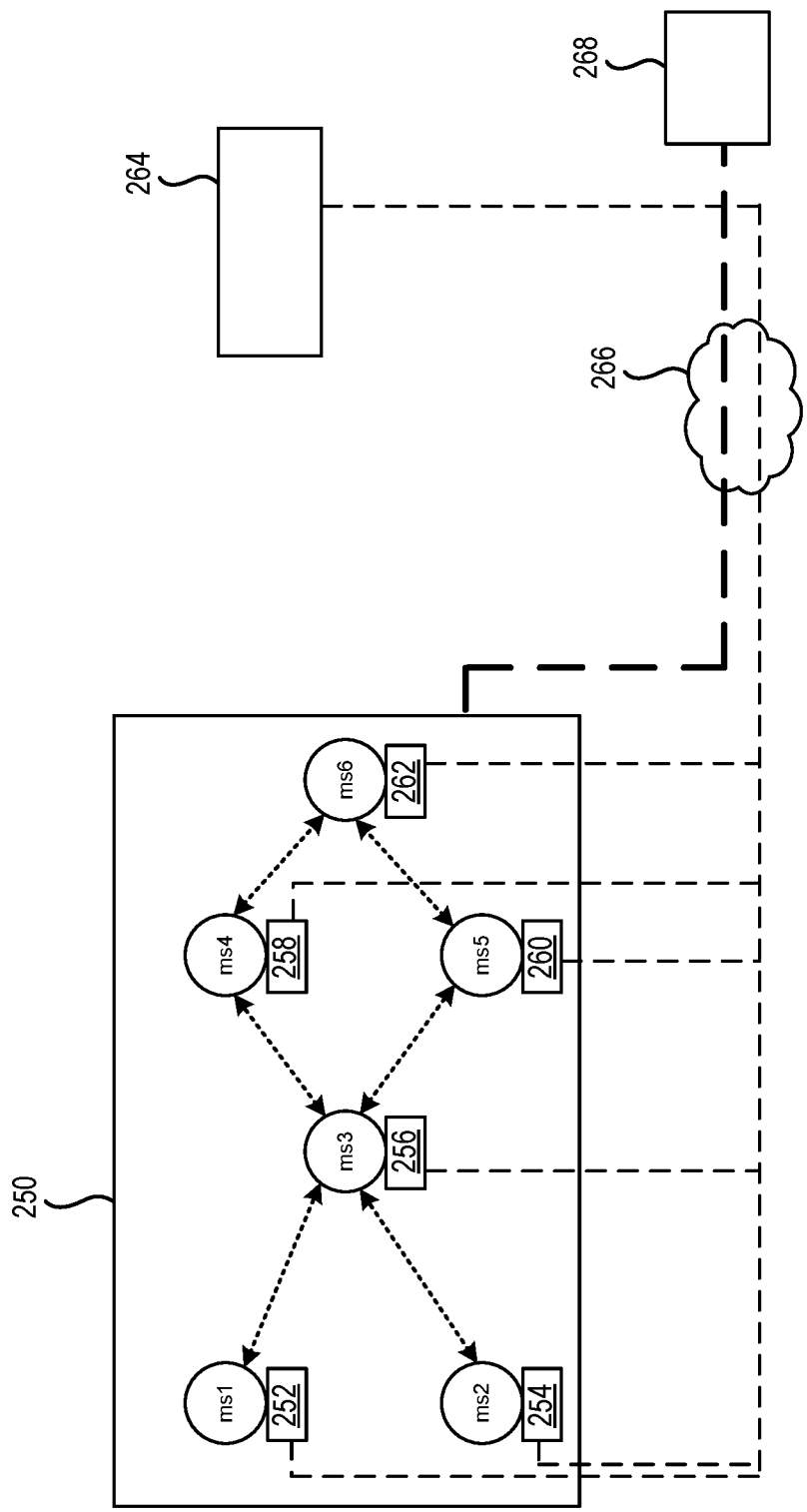
FIG. 2B is a representational view of the logical relationship between components of a distributed system, in accordance with one approach.

Referring momentarily to FIG. 2B, a representational view of how a distributed application 250 may be logically organized and performed, is illustrated in accordance with one approach. As an option, the present distributed application 250 may be implemented in conjunction with features from any other approach listed herein, such as those described with reference to the other FIGS., such as FIGS. 1-2A. However, this distributed application 250 and others presented herein may be used in various applications and/or in permutations which may or may not be specifically described in the illustrative approaches or implementations listed herein. Further, the distributed application 250 presented herein may be used in any desired environment. Thus FIG. 2B (and the other FIGS.) may be deemed to include any possible permutation.

As shown, the distributed application 250 includes microservices ms1, ms2, ms3, ms4, ms5, and ms6. According to some approaches, the distributed application 250 may be deployed on a container orchestration platform. For example, the distributed application 250 may be deployed using Kubernetes™ or OpenShift™.

The microservices in distributed application 250 are illustrated as separate portions that may be performed by a respective microcontroller, controller, processor, compute node, etc. The microservices ms1, ms2, ms3, ms4, ms5, ms6 are also coupled to respective sidecar modules 252, 254, 256, 258, 260, 262. With respect to the present description, a "sidecar module" may include an agent or container that is configured to operate (e.g., run) in conjunction with the microservice, e.g., as would be appreciated by one skilled in the art after reading the present description.

The dashed lines extending between the respective pairs of microservices and sidecar modules represent an example topology of the paths along which information is exchanged between the microservices. The number, type, orientation, etc. of the various topology paths may vary depending on the distributed application and/or the microservices themselves. Accordingly, the topology paths shown in FIG. 2B are in no way intended to be limiting. It should also be noted that the topology of interactions amongst the microservices may be represented using tools such as Kiali.

In addition to being connected to each other according to the topology, each respective microservice and sidecar module pair is also in communication with a central processing engine 264 over network 266, e.g., as represented by the dashed lines. It follows that information (including observability data) may be sent between pairs of microservices ms1, ms2, ms3, ms4, ms5, ms6 and sidecar modules 252, 254, 256, 258, 260, 262 that are connected according to the topology, as well as between the central processing engine and each respective microservice and sidecar module pair. Distributed application 250 is also shown as sending any collected and evaluated observability data to an observability pipeline 268. The observability pipeline 268 may store the received observability data and/or direct the observability data to downstream use cases.

Referring still to the distributed application 250, the sidecar modules 252, 254, 256, 258, 260, 262 are preferably configured to analyze observability data locally. In other words, each of the sidecar modules 252, 254, 256, 258, 260, 262 may be responsible for detecting anomalous observability data originating from their respective microservices. In some approaches, "observability data" includes log lines which include golden signal labels, e.g., such as error, latency, saturation, availability, etc., each of which may be evaluated. Each of the sidecar modules 252, 254, 256, 258, 260, 262 may include one or more machine learning models that have been trained to evaluate the observability data and detect anomalous portions therein. For instance, the machine learning models may be trained using performance details as they are experienced in real-time to develop an understanding of how different microservices perform. Moreover, the machine learning models may be trained using unsupervised training procedures across a number of different configurations.

For instance, observability data produced during healthy (e.g., nominal) execution of an application or microservice may be learned, and identified as "normal clusters." Conversely, when a fault manifests during use, the observability data that is generated in correlation to the fault would not match any of the previously identified normal clusters. Accordingly, the fault may be quickly identified, allowing for downstream actions to be performed more quickly as well, e.g., such as increasing observability data production.

In other approaches, erroneous log lines may be detected by using golden signals. With respect to the present description, "golden signals" refer to a set of key performance indicators (KPIs) used for monitoring log and metric events, which in turn may be used to analyze the health of a corresponding system. In some approaches, implementing golden signals is preferred for offering a convenient and efficient method of detecting and troubleshooting errors. It should also be noted that a golden signal may be a classifier that takes as input a log line or metric, and assigns it one of the golden signal labels. For example, in situations where the golden signal label is set to "error," "availability," "saturation," or "latency," it may be determined that the corresponding microservice is degraded. However, in situations where the golden signal label is set to "information," it may be determined that the corresponding microservice is not degraded (e.g., healthy).

Once the observability data produced by one of the microservices ms1, ms2, ms3, ms4, ms5, ms6 has been analyzed by a respective one of the sidecar modules 252, 254, 256, 258, 260, 262, status information describing the states of the microservices may be generated. For example, an indication of whether each microservice in the distributed application 250 is in a degraded state or a nominal (non-degraded) state may be represented in the status information. It follows that the status information may be used to make additional determinations about how much observability data is generated. For example, excess observability data evaluation in situations where a microservice is operating nominally and "healthy" is typically a waste of compute resources. However, maintaining minimal observability data evaluations during failure events will likely result in significant application degradation.

According to an example, in response to determining that a microservice has a desirable operating status, a corresponding sidecar module may intentionally discard a majority of the observability data generated by the microservice. In some approaches, the sidecar module may even cause the microservice to generate less observability data, thereby reducing processing and data storage overhead during nominal operation. However, in response to determining that a microservice has an undesirable operating status, a corresponding sidecar module may intentionally increase the amount of observability data that is generated by the microservice. The sidecar module may also intentionally alter the amount of observability data that is generated by microservices that are correlated with the microservice that has the undesirable operating status. Alternatively, the central processing engine 264 may be used to determine which additional microservices should adjust the amount of observability data being produced. In some approaches, this determination is based on a blast radius or using some configurable policy. For example, a predetermined setting may dictate that microservices within two hops from an affected microservice should be notified, e.g., as will be described in further detail below.

Figure 3A:
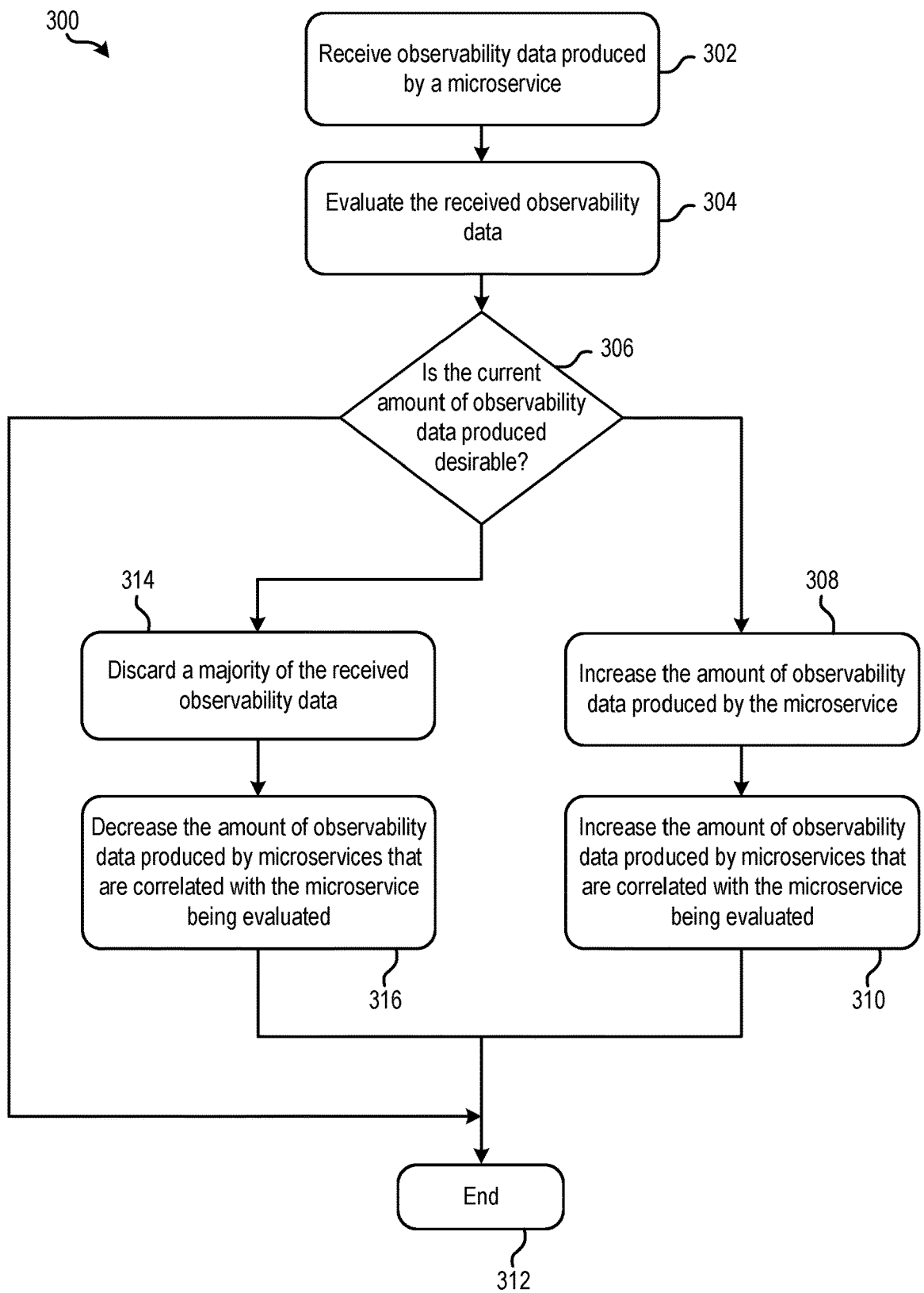
FIG. 3A is a flowchart of a method, in accordance with one approach.

Referring now to FIG. 3A, a method 300 for dynamically adjusting the amount of observability data that is evaluated and/or produced by distributed applications based on real-time performance characteristics of the distributed applications themselves, is illustrated in accordance with one approach. Method 300 may be performed in accordance with the present invention in any of the environments depicted in FIGS. 1-2B, among others, in various approaches. Of course, more or less operations than those specifically described in FIG. 3A may be included in method 300, as would be understood by one of skill in the art upon reading the present descriptions.

Each of the steps of the method 300 may be performed by any suitable component of the operating environment using known techniques and/or techniques that would become readily apparent to one skilled in the art upon reading the present disclosure. For example, one or more of the operations in method 300 may be performed by any of the sidecar modules and/or microcontrollers associated with portions of a distributed application (e.g., see sidecar modules 252, 254, 256, 258, 260, 262 of FIG. 2B above).

Again, FIG. 3A illustrates a process of dynamically adjusting the amount of observability data that is evaluated and/or produced by distributed applications based on real-time performance characteristics of the distributed applications themselves. Accordingly, operation 302 includes receiving observability data produced by a first portion of a distributed application, while operation 304 includes evaluating the received observability data. In other words, operations 302 and 304 include receiving and evaluating the observability data produced by a microservice that is part of a distributed application.

The evaluation in operation 304 may be performed according to predefined rules and/or criteria of any suitable type that would become apparent to one skilled in the art after reading the present disclosure. For example, the observability data and/or amount thereof may be compared to predefined criteria that specify whether the observability data, and/or amount thereof, is adequate for a desired purpose given the current operating status of the microservice being evaluated. Nonlimiting examples of evaluations are provided below.

As noted above, microservices generate and emit observability data that may be used to determine how the microservices are performing. For example, information logs may be generated as observability data. These information logs and other types of observability data may further be evaluated to determine status information of the microservices. Again, the observability data provides the insight into how different aspects of the microservice are performing in real-time. This observability data may thereby be evaluated and used to generate status information. The status information may also be sent to other microservices, evaluated to determine which correlated microservices should be notified of undesirable status information, etc. However, other techniques can be applied to metrics, events, or other forms of telemetry, e.g., depending on the desired approach. It follows that different microservices may produce a different amount of observability data. Moreover, applications herein can dynamically adjust this amount of produced observability data based on how the microservices and overarching distributed applications are performing.

According to another example, each application microservice may be configured to emit different levels of logs. Moreover, the different levels of log generation may be correlated with the different operating conditions. In other words, the amount of observability data generated by each microservice is directly related to whether the microservice is currently experiencing an "ERROR" condition, a "CRITICAL" condition, an "INFO" condition, a "WARN" condition, a "DEBUG" condition, etc.

Operation 306 further includes determining whether the current amount of observability data being produced by the microservice is desirable. In other words, operation 306 includes determining whether the status of the microservice indicates that an increase should be made to the amount of observability data currently being produced by the respective microservice. According to an example, determining that the microservice is currently degraded (e.g., experiencing a "ERROR" condition and/or a "CRITICAL" condition) causes the amount of observability data being produced to increase. As previously mentioned, this increase in observability data allows for more thorough analysis to be performed in an attempt to solve the degraded state of the microservice.

Method 300 thereby proceeds from operation 306 to operation 308 in response to determining that more observability data should be generated. There, operation 308 includes causing an amount of the observability data produced by the microservice being evaluated to increase. In other words, operation 308 includes sending one or more instructions to a microcontroller implementing the microservice, the one or more instructions ultimately causing the microcontroller to intentionally generate a greater amount of observability data than before.

In addition to increasing the amount of observability data produced by the microservice being evaluated, data production of other microservices that are correlated with the evaluated microservice may also be adjusted. In other words, the performance of one microservice may have a direct correlation to the performance of another microservice. Accordingly, operation 310 includes increasing the amount of observability data produced by microservices that are correlated with the microservice being evaluated.

In some implementations, a microcontroller performing the operations of method 300 may simply notify a centralized processing engine of the status of the microservice being evaluated, and the processing engine uses that information to determine the microservices that should also be adjusted, e.g., based on the status of the evaluated microservice, patterns identified by training machine learning models using historical performance data, user preferences, etc. The central processing engine may thereby actually cause an increase in observability data produced by correlated microservices. For instance, one or more instructions may be sent which cause each of the correlated microservices to increase observability data production.

However, other approaches may not access a centralized processing engine to identify the correlated microservices that should also be notified. Rather, a "gossip protocol" can be used to disseminate changes in status among microservices. In these approaches, a sidecar module attached to a microservice experiencing a degraded state broadcasts this status update to the immediate neighbor microservices according to the topological relationship between them. These neighboring microservices may in turn propagate the status update to their neighboring microservices, and so on.

Sidecar modules may also be able to determine the number of "hops" a status update has experienced. Thus, when a sidecar module receives a status update from its neighbor, the module evaluates the hop count of the update to determine whether observability data production should be increased, decreased, or maintained by dropping the received status update. This approach enables quick and efficient dissemination of status updates throughout the network without the need for a central processing engine or inferring an ever-evolving topology. It also provides a scalable and fault-tolerant solution.

Figure 3B:
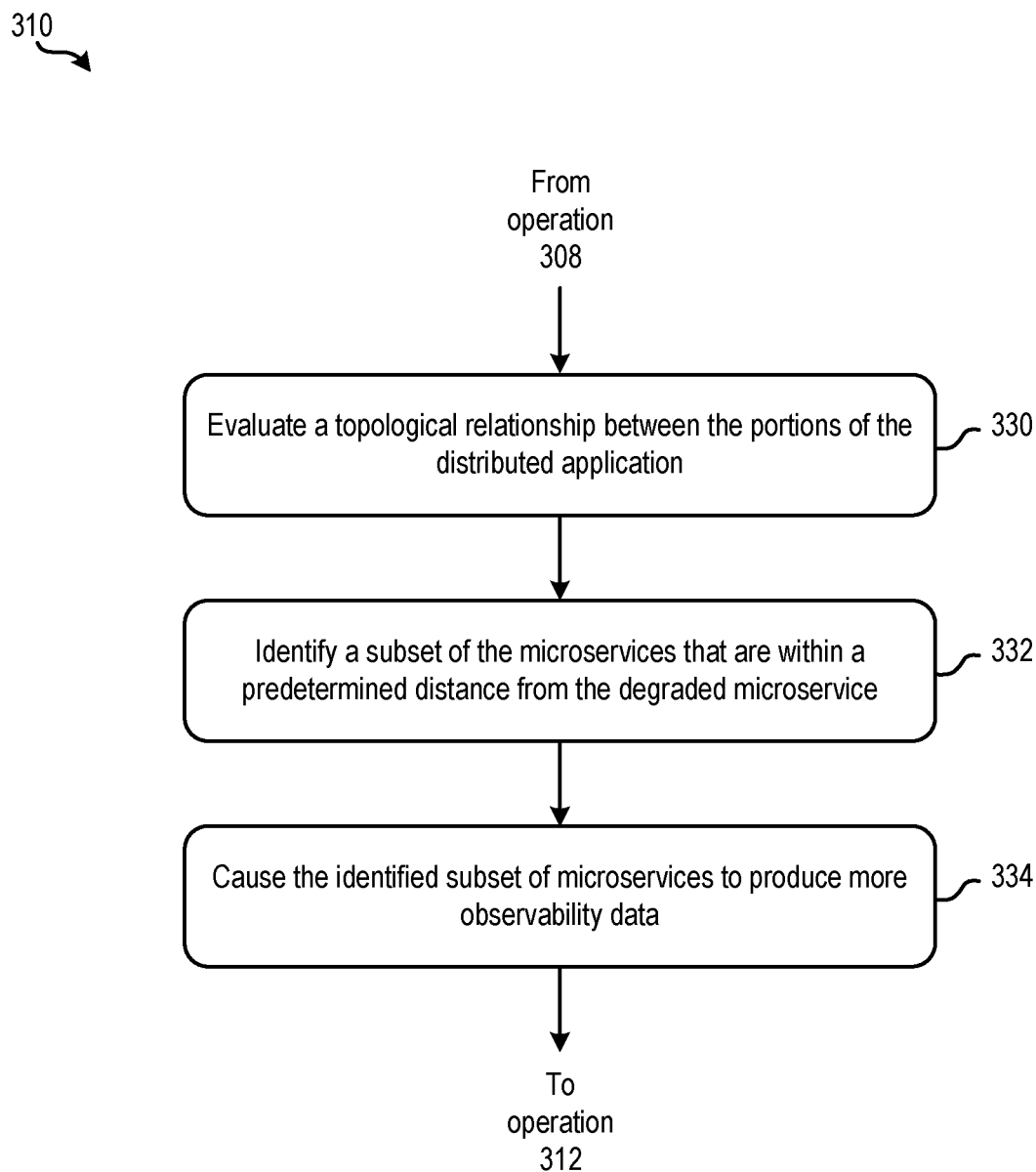
FIG. 3B is a flowchart of sub-operations for one of the operations in the method of FIG. 3A, in accordance with one approach.

Referring momentarily to FIG. 3B, exemplary sub-operations of adjusting the amount of observability data produced by microservices that are correlated with a particular microservice being evaluated are illustrated in accordance with one approach. It follows that one or more of these sub-operations may be used to perform operation 310 of FIG. 3A. However, it should be noted that the sub-operations of FIG. 3B are illustrated in accordance with one approach which is in no way intended to be limiting.

Sub-operation 330 includes evaluating a topological relationship between the portions of the distributed application. As previously mentioned, the number, type, orientation, etc. of the various communication paths that extend between microservices in a same distributed application may vary depending on the distributed application and/or the microservices themselves. Accordingly, the topology paths may be represented as a topological relationship between the microservices. In other words, the topological relationship outlines how the microservices interact with each other.

It follows that by evaluating the topological relationship, an understanding of how the different microservices interact may be formed. Sub-operation 332 thereby further includes identifying a subset of the microservices that are within a predetermined distance from the degraded microservice. In other words, sub-operation 332 identifies each of the microservices that are close enough to a microservice experiencing degradation, that the identified microservices should also produce more observability data to avoid issues affecting multiple nodes that are interrelated.

As previously mentioned, some approaches may establish a predetermined distance that defines a boundary, inside of which microservices are treated the same or similar. For example, a predetermined operating rule may indicate that microservices within 3 "hops" of a microservice experiencing an ERROR setting are instructed to increase observability data production. With respect to the present description, a "hop" is intended to refer to a connection between two microservices. Thus, microservices that are 2 hops from each other have an intermediary microservice positioned therebetween.

According to another example, microservices that are closest to a degraded microservice may be set to a highest observability data production setting, while microservices farthest from the degraded microservice may be set to a lowest observability data production setting. It follows that the amount by which production of observability data changes for a given microservice depends on how close the microservice is to a microservice experiencing an issue. For example, the amount by which observability data increases is proportional to the distance to a degraded microservice, e.g., such that microservices 1 hop from a failed microservice increase observability data production to a highest level, microservices 2 hops from a failed microservice increase observability data production to a next highest level, and so on.

In some approaches, a sidecar module is able to determine the number of "hops" a status update has experienced before being received. Thus, when a sidecar module receives a status update from its neighbor, the module evaluates the hop count of the update to determine whether observability data production should be increased, decreased, or maintained by dropping the received status update. This approach enables quick and efficient dissemination of status updates throughout the network without the need for a central processing engine or inferring an ever-evolving topology. It also provides a scalable and fault-tolerant solution.

Referring still to FIG. 3B, the flowchart proceeds to sub-operation 334 from sub-operation 332. There, sub-operation 334 includes causing the identified subset of microservices to produce more observability data. In some approaches, sub-operation 334 includes sending instructions to microcontrollers correlated with the identified subset of microservices. The instructions ultimately cause the respective microcontrollers to increase the amount of observability data that is produced by each of the microservices in the identified subset.

From sub-operation 334, the flowchart returns to operation 312 of FIG. 3A, whereby method 300 may end. However, it should be noted that although method 300 may end upon reaching operation 312, any one or more of the processes included in method 300 may be repeated in order to evaluate additional microservices. In other words, any one or more of the processes included in method 300 may be repeated for subsequently received observability data and/or identified status changes.

Returning to operation 306 of FIG. 3A, it should be noted that alternate operations may be performed in response to the observability data being evaluated differently. For instance, method 300 proceeds to operation 314 in response to determining that less observability data should be generated. For example, method 300 proceeds to operation 314 in response to determining that the received observability data indicates the microservice being evaluated is not degraded, e.g., is operating nominally. There, operation 314 includes discarding at least a majority of the received observability data. In other words, only a portion of the observability data originally received in operation 302 may be stored in memory (e.g., uploaded to a cloud storage environment). Reducing the amount of data retained from periods of nominal performance in this way reduces data storage consumption as well as data processing overhead. Moreover, these improvements do not negatively impact performance of the system as a whole by dynamically adjusting the amount of observability data that is retained depending on the real-time performance.

Accordingly, operation 316 includes causing an amount of the observability data produced by the microservice being evaluated to decrease. In other words, operation 316 includes sending one or more instructions to a microcontroller implementing the microservice being evaluated, the one or more instructions ultimately causing the microcontroller to intentionally generate a lesser amount of observability data than before.

Returning again to operation 306, method 300 may proceed directly to operation 312 in response to determining that the same amount of observability data should be generated. In other words, method 300 may end in response to determining that the amount of observability data currently being generated should not be changed. For example, method 300 may proceed to operation 312 in response to determining that the received observability data indicates the microservice being evaluated has not changed states since last being evaluated.

It follows that method 300 is able to decrease stress to distributed applications and/or system infrastructure caused by the generation and processing of observability data. Moreover, this reduced stress does not negatively impact the ability to perform effective monitoring of application performance in real-time. For instance, the operations of method 300 are desirably able to provide sufficient observability data to conduct downstream operations, e.g., such as fault management and monitoring, while also reducing overhead associated with data generation, processing, and storage.

It should be noted that while various operations of method 300 have been described as being performed by a sidecar module (e.g., agent) and/or microcontroller associated with a portion (e.g., microservice) of a distributed application, this is in no way intended to be limiting. For instance, at least some of the operations may be performed by a central processing engine in communication with different sidecar modules and/or microcontrollers that have been correlated with the different portions of the application.

Figure 3C:
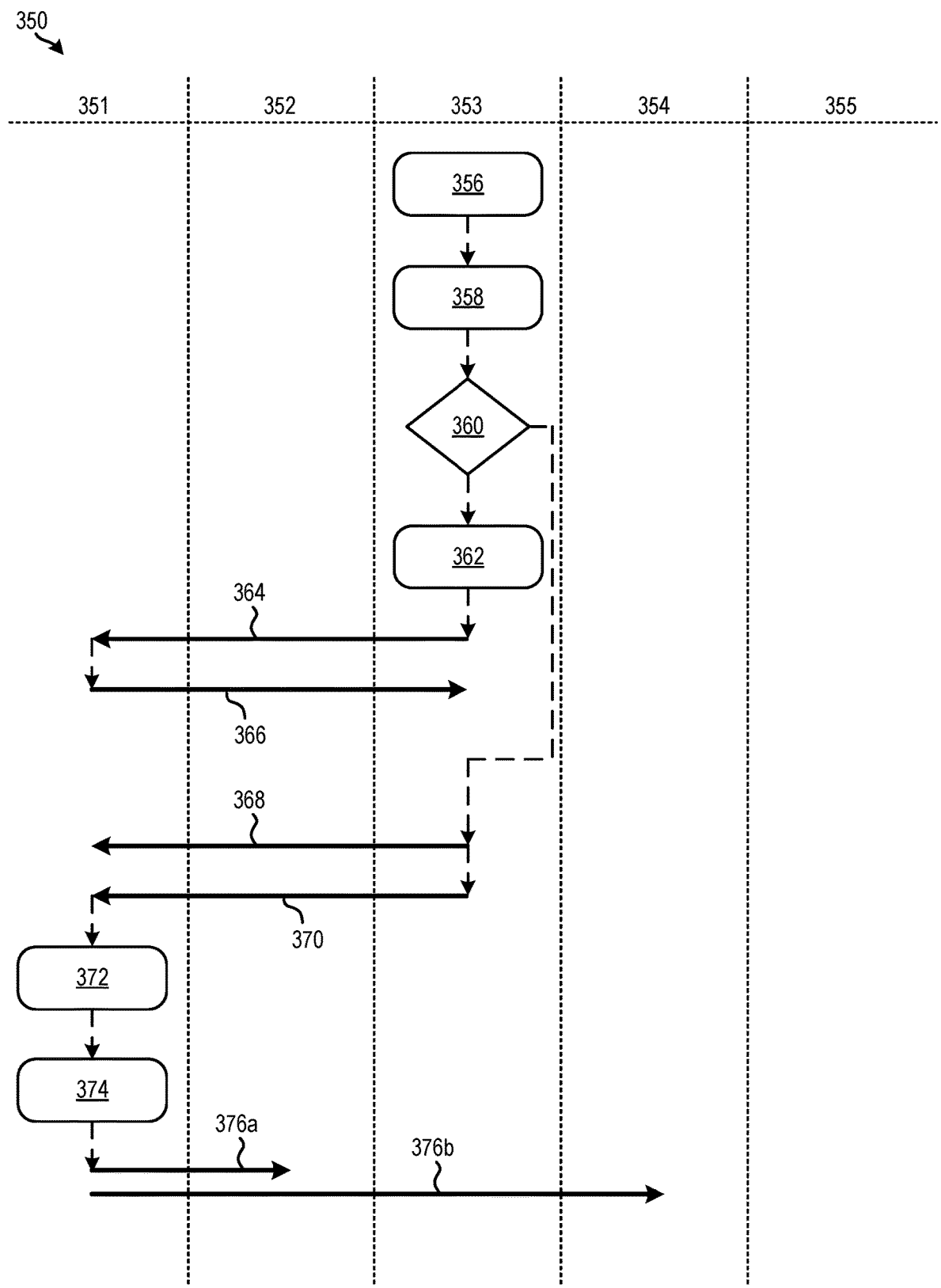
FIG. 3C is a flowchart of a method, in accordance with one approach.

Accordingly, FIG. 3C below illustrates a method 350 for dynamically adjusting the amount of observability data that is evaluated and/or produced by distributed applications based on real-time performance characteristics of the distributed applications themselves, in accordance with one approach. Accordingly, one or more of the operations in method 350 may be similar or the same as those included in method 300 of FIG. 3A. It follows that performing method 350 may incorporate any of the approaches described above in relation to performing method 300. Moreover, method 350 may be performed in accordance with the present invention in any of the environments depicted in FIGS. 1-2B, among others, in various approaches. Of course, more or less operations than those specifically described in FIG. 3B may be included in method 350, as would be understood by one of skill in the art upon reading the present descriptions.

Each of the steps of the method 350 may be performed by any suitable component of the operating environment. For example, each of the nodes 351, 352, 353, 354, 355 shown in the flowchart of method 350 may correspond to one or more microcontrollers, each of which are configured to monitor performance of a different microservice. Moreover, each of the one or more processors are preferably configured to communicate with each other.

It follows that method 350 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 350. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 3A includes different nodes 351, 352, 353, 354, 355, each of which represent a microcontroller implemented with a corresponding microservice, at a different location in a distributed data storage system. For instance, node 351 may include a central processing engine of a distributed compute system (e.g., see central processing engine 264 of FIG. 2B and/or processor 212 of FIG. 2A above). The remaining nodes 352, 353, 354, 355 may each include a microcontroller positioned at a respective location in a distributed compute system (e.g., see microservice and sidecar module pairs in distributed application 250 of FIG. 2B and/or processor 216 and controller 217 of FIG. 2A above). Accordingly, commands, data, requests, etc. may be sent between each of the nodes 351, 352, 353, 354, 355.

Moreover, it should be noted that the various processes included in method 350 are in no way intended to be limiting, e.g., as would be appreciated by one skilled in the art after reading the present description. For instance, data sent from node 352 to node 353 may be prefaced by a request sent from node 353 to node 352, in some approaches. Additionally, the number of nodes included in FIG. 3A is in no way intended to be limiting. For instance, a number of microservices included in a distributed application may impact the number of nodes that are implemented. Accordingly, any desired number of edge nodes may be connected to the central processing engine, e.g., as would be appreciated by one skilled in the art after reading the present description.

Looking to FIG. 3A, method 350 includes operation 356 which is performed at node 353. There, operation 356 includes receiving observability data produced by the microservice implemented at node 353, while operation 358 includes evaluating the received observability data. In response to evaluating the received observability data, operation 360 includes determining the current status of the microservice. As noted above, the status of a given microservice may be determined using one or more machine learning models that have been trained to identify patterns in the observability data, and make inferences based on those identified patterns. Accordingly, operations 358 and/or 360 may involve applying one or more trained machine learning models.

In response to determining that the microservice in question is operating nominally (e.g., not degraded), method 350 proceeds to operation 362 from operation 360. There, operation 362 includes discarding at least a majority of the received observability data. In other words, only a portion of the observability data originally received in operation 356 may be retained. Accordingly, operation 364 includes sending the remaining portion of the observability data to node 351. In other words, the remaining observability data is transferred (e.g., uploaded) to a central processing engine at node 351 for evaluation and/or storage. Node 351 thereby receives a condensed version of the observability data generated at node 353. Reducing the amount of data that is transferred over a network during periods of nominal performance in this way reduces data storage consumption as well as data processing overhead. Moreover, these improvements do not negatively impact performance of the system as a whole by dynamically adjusting the amount of observability data that is retained depending on the real-time performance.

In response to receiving the remaining observability data at node 351, the processing engine is able to determine the microservice that produced the received observability data is operating desirably. Accordingly, operation 366 further includes causing an amount of the observability data produced by the microservice being evaluated at node 353 to decrease. In other words, operation 366 includes sending one or more instructions to a microcontroller at node 353 that is implementing the microservice being evaluated, the one or more instructions ultimately causing the microcontroller to intentionally generate a lesser amount of observability data than before. One or more instructions may also be sent to additional microcontrollers implementing microservices that are correlated with the microservice implemented at node 353. In other words, the central processing engine may identify related microservices and cause the amount of observability data generated by those related microservices to be increased by a desired amount as well.

Returning to operation 360, method 350 is shown as proceeding directly to operation 368 in response to determining that the microservice in question is operating undesirably (e.g., has become degraded). There, operation 368 includes sending status information to node 351 which indicates node 353 is experiencing an undesirable situation. In other words, operation 368 includes sending status information indicating that node 353 is currently degraded.

In addition to receiving the status information associated with the microservice implemented at node 353, node 351 also receives a complete version (e.g., copy) of the observability data produced by the microservice at node 353. See operation 370. In response to receiving the status information and the observability data from node 353, the processing engine at node 351 identifies other portions of the distributed application that are correlated with the microservice implemented at node 353. Accordingly, operation 372 includes evaluating a topological relationship between the microservices implemented at each of the nodes 352, 353, 354, 355. Based on this evaluation, operation 374 includes identifying a subset of the microservices at nodes 352, 354, 355 that are within a predetermined distance from the degraded node 353 of the distributed application.

Furthermore, operations 376a and 376b include causing the amount of observability data produced by the microservices identified as being correlated with the microservice at node 353. In other words, operation 376a sends one or more instructions to node 352, while operation 376b sends one or more instructions to node 354. It follows that the microservices implemented at nodes 352, 354 have been identified in the present implementation as being sufficiently correlated with the microservice implemented at node 353. Moreover, the strength of the correlation between two microservices may be determined using a topological relationship which outlines how the microservices interact with each other, e.g., as would be appreciated by one skilled in the art after reading the present description.

Again, implementations herein are able to dynamically adjust the amount of observability data that is evaluated and/or produced by distributed applications based on real-time performance characteristics of the distributed applications themselves. This desirably decreases stress to distributed applications and/or system infrastructure caused by the generation and processing of observability data. Moreover, this reduced stress does not negatively impact the ability to perform effective monitoring of application performance in real-time. For instance, approaches herein are desirably able to provide sufficient observability data to conduct downstream operations, e.g., such as fault management and monitoring, while also reducing overhead associated with data generation, processing, and storage that has plagued conventional products.

Overall, approaches herein enable systems to collect an amount of observability data that is proportional to the operating condition of the underlying microservice and/or a distributed application, while also reducing the impact of observability. Thus, in situations where an issue is detected locally in a component, nearby services are alerted, and adequate data is collected for meaningful performance analysis. This fares better than collecting large amounts of information at all times. These improvements may also be achieved in situations involving multi-geographical, multi-cloud, multi-edge, etc., scenarios, where observability data is transferred to a centralized location from different sites for further processing and retention.

As noted herein, some approaches involve actively adjusting the amount of observability data that is generated by a given microservice. In other words, instructions may be sent to the microservice that result in the microservice changing the amount of observability data that is generated. However, other approaches may involve generating a consistent amount of observability data, and portions of the generated data is filtered out in situations where only a relatively small amount of observability data is desired.

Again, machine learning models may be trained to evaluate observability data generated by a microservice (e.g., "portion") of the distributed application and determine whether the microservice is degraded or not. Implementations herein can thereby adjust the amount of observability data produced and evaluated, based on the status of the distributed application. In other words, implementations are able to dynamically adjust the resources that are consumed by the data observability process to ensure the distributed application operates as desired. For instance, the machine learning models may be trained using performance details as they are experienced in real-time to develop an understanding of how different microservices perform.

Figure 4:
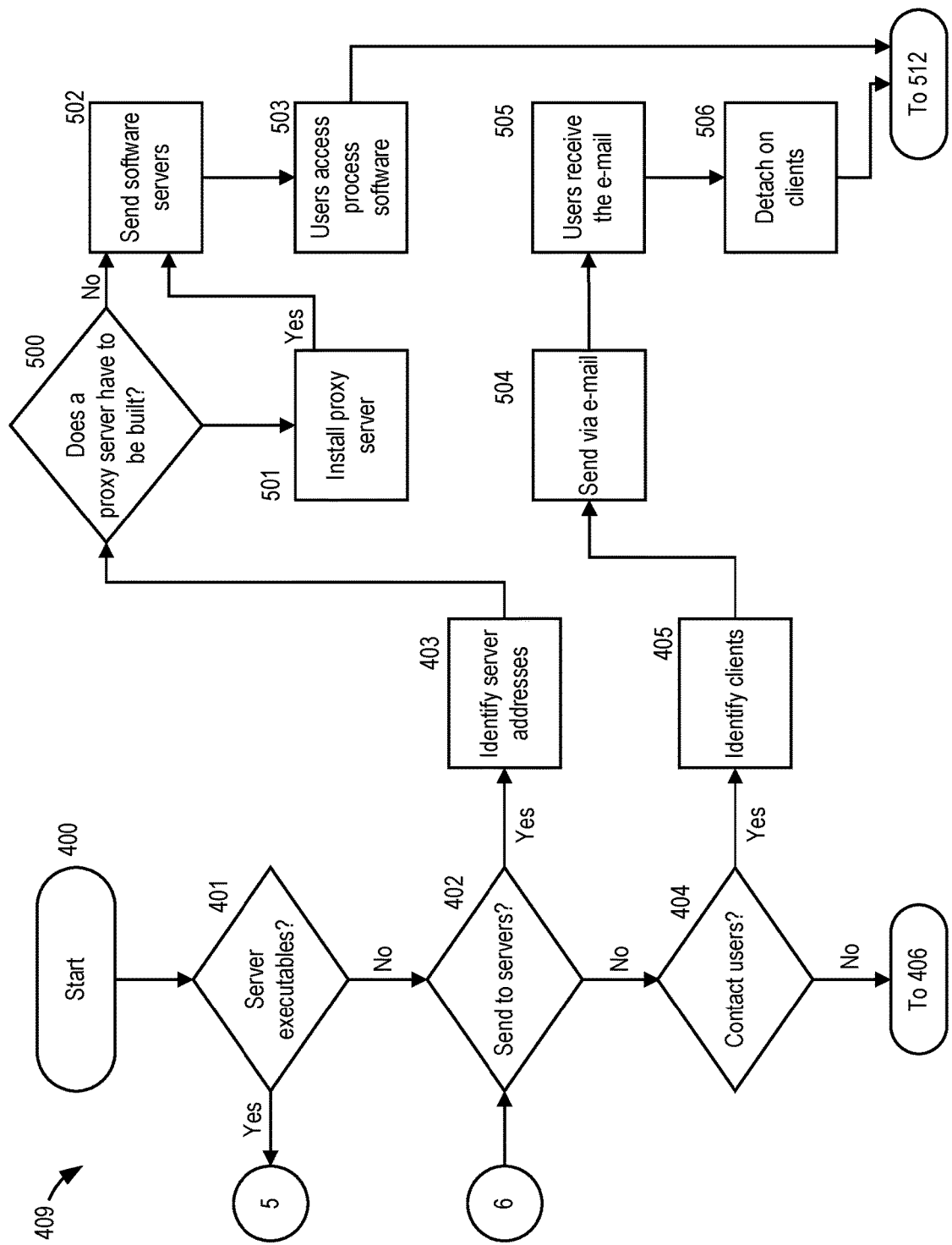
FIG. 4 is a flowchart of a method, in accordance with one approach.
Figure 4:
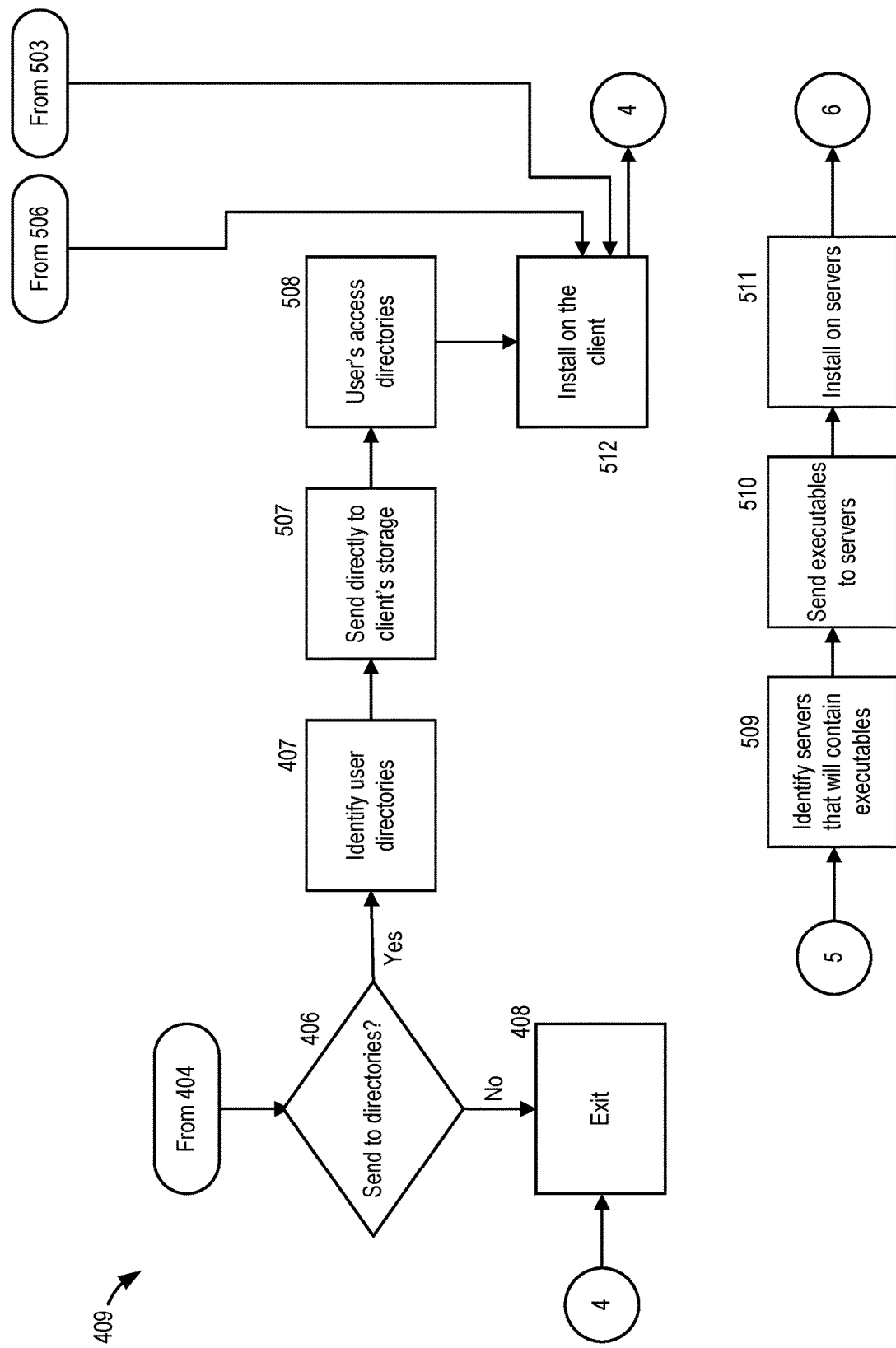

Now referring to FIG. 4, a flowchart of a method 409 is shown according to one approach. The method 409 may be performed in accordance with the present invention in any of the environments depicted in FIGS. 1-3B, among others, in various approaches. Of course, more or fewer operations than those specifically described in FIG. 4 may be included in method 409, as would be understood by one of skill in the art upon reading the present descriptions.

Each of the steps of the method 409 may be performed by any suitable component of the operating environment. For example, in various approaches, the method 409 may be partially or entirely performed by a processing circuit, e.g., such as an IaC access manager, or some other device having one or more processors therein. The processor, e.g., processing circuit(s), chip(s), and/or module(s) implemented in hardware and/or software, and preferably having at least one hardware component, may be utilized in any device to perform one or more steps of the method 409. Illustrative processors include, but are not limited to, a central processing unit (CPU), an application specific integrated circuit (ASIC), a field programmable gate array (FPGA), etc., combinations thereof, or any other suitable computing device known in the art.

While it is understood that the process software associated with dynamically adjusting the amount of observability data that is evaluated and/or produced by distributed applications based on real-time performance characteristics of the distributed applications themselves, may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

With continued reference to method 409, step 400 begins the deployment of the process software. An initial step is to determine if there are any programs that will reside on a server or servers when the process software is executed (401). If this is the case, then the servers that will contain the executables are identified (509). The process software for the server or servers is transferred directly to the servers' storage via FTP or some other protocol or by copying through the use of a shared file system (510). The process software is then installed on the servers (511).

Next, a determination is made on whether the process software is to be deployed by having users access the process software on a server or servers (402). If the users are to access the process software on servers, then the server addresses that will store the process software are identified (403).

A determination is made if a proxy server is to be built (500) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (501). The process software is sent to the (one or more) servers either via a protocol such as FTP, or it is copied directly from the source files to the server files via file sharing (502). Another approach involves sending a transaction to the (one or more) servers that contained the process software, and have the server process the transaction and then receive and copy the process software to the server's file system. Once the process software is stored at the servers, the users, via their client computers, then access the process software on the servers and copy to their client computers file systems (503). Another approach is to have the servers automatically copy the process software to each client and then run the installation program for the process software at each client computer. The user executes the program that installs the process software on the client computer (512) and then exits the process (408).

In step 404 a determination is made whether the process software is to be deployed by sending the process software to users via e-mail. The set of users where the process software will be deployed are identified together with the addresses of the user client computers (405). The process software is sent via e-mail (504) to each of the users' client computers. The users then receive the e-mail (505) and then detach the process software from the e-mail to a directory on their client computers (506). The user executes the program that installs the process software on the client computer (512) and then exits the process (408).

Lastly, a determination is made on whether the process software will be sent directly to user directories on their client computers (406). If so, the user directories are identified (407). The process software is transferred directly to the user's client computer directory (507). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (508). The user executes the program that installs the process software on the client computer (512) and then exits the process (408).

It will be clear that the various features of the foregoing systems and/or methodologies may be combined in any way, creating a plurality of combinations from the descriptions presented above.

It will be further appreciated that implementations of the present invention may be provided in the form of a service deployed on behalf of a customer to offer service on demand.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A computer-implemented method, comprising:
receiving observability data produced by a first portion of a distributed application;
evaluating the observability data; and
in response to determining that the observability data indicates the first portion of the distributed application is degraded:
causing an amount of the observability data produced by the first portion of the distributed application to increase, and
causing an amount of observability data produced by other portions of the distributed application that are correlated with the first portion of the distributed application to increase.

2. The computer-implemented method of claim 1, wherein causing the amount of observability data produced by the other portions of the distributed application to increase includes:
evaluating a topological relationship between the portions of the distributed application;
identifying a subset of the portions of the distributed application that are within a predetermined distance from the degraded first portion of the distributed application; and
causing the amount of observability data produced by the portions of the distributed application in the identified subset to increase.

3. The computer-implemented method of claim 2, wherein each portion of the distributed application is a microservice, wherein the topological relationship outlines how the microservices interact with each other.

4. The computer-implemented method of claim 2, wherein causing the amount of observability data produced by the portions of the distributed application in the identified subset to increase includes:
sending instructions to microcontrollers correlated with the portions of the distributed application in the identified subset, the instructions causing the microcontrollers to increase the amount of observability data produced by each of the distributed application in the identified subset.

5. The computer-implemented method of claim 4, wherein the operations are performed by a microcontroller correlated with the first portion of the distributed application.

6. The computer-implemented method of claim 1, comprising:
in response to determining that the observability data indicates the first portion of the distributed application is not degraded, discarding at least a majority of the received observability data.

7. The computer-implemented method of claim 6, comprising:
in response to determining that the observability data indicates the first portion of the distributed application is not degraded, causing the amount of the observability data produced by the first portion of the distributed application to be decreased.

8. A computer program product, comprising a computer readable storage medium having program instructions embodied therewith, the program instructions readable by a processor, executable by the processor, or readable and executable by the processor, to cause the processor to:
receive observability data produced by a first portion of a distributed application;
evaluate the observability data; and
in response to determining that the observability data indicates the first portion of the distributed application is degraded:
cause an amount of the observability data produced by the first portion of the distributed application to increase, and
cause an amount of observability data produced by other portions of the distributed application that are correlated with the first portion of the distributed application to increase.

9. The computer program product of claim 8, wherein causing the amount of observability data produced by the other portions of the distributed application to increase includes:
evaluating a topological relationship between the portions of the distributed application;
identifying a subset of the portions of the distributed application that are within a predetermined distance from the degraded first portion of the distributed application; and
causing the amount of observability data produced by the portions of the distributed application in the identified subset to increase.

10. The computer program product of claim 9, wherein each portion of the distributed application is a microservice, wherein the topological relationship outlines how the microservices interact with each other.

11. The computer program product of claim 9, wherein causing the amount of observability data produced by the portions of the distributed application in the identified subset to increase includes:
sending instructions to microcontrollers correlated with the portions of the distributed application in the identified subset, the instructions causing the microcontrollers to increase the amount of observability data produced by each of the distributed application in the identified subset.

12. The computer program product of claim 11, wherein the operations are performed by a microcontroller correlated with the first portion of the distributed application.

13. The computer program product of claim 8, wherein the program instructions are readable and/or executable by the processor to cause the processor to:
in response to determining that the observability data indicates the first portion of the distributed application is not degraded, discard at least a majority of the received observability data.

14. The computer program product of claim 13, wherein the program instructions are readable and/or executable by the processor to cause the processor to:
in response to determining that the observability data indicates the first portion of the distributed application is not degraded, cause the amount of the observability data produced by the first portion of the distributed application to be decreased.

15. A system, comprising:
a processor; and
logic integrated with the processor, executable by the processor, or integrated with and executable by the processor, the logic being configured to:
receive observability data produced by a first portion of a distributed application;
evaluate the observability data; and
in response to determining that the observability data indicates the first portion of the distributed application is degraded:
cause an amount of the observability data produced by the first portion of the distributed application to increase, and
cause an amount of observability data produced by other portions of the distributed application that are correlated with the first portion of the distributed application to increase.

16. The system of claim 15, wherein causing the amount of observability data produced by the other portions of the distributed application to increase includes:
evaluating a topological relationship between the portions of the distributed application;
identifying a subset of the portions of the distributed application that are within a predetermined distance from the degraded first portion of the distributed application; and
causing the amount of observability data produced by the portions of the distributed application in the identified subset to increase.

17. The system of claim 16, wherein each portion of the distributed application is a microservice, wherein the topological relationship outlines how the microservices interact with each other.

18. The system of claim 15, wherein the logic is configured to:
in response to determining that the observability data indicates the first portion of the distributed application is not degraded:
discard at least a majority of the received observability data, and
cause the amount of the observability data produced by the first portion of the distributed application to be decreased.

19. A computer-implemented method, comprising:
receiving observability data associated with a first portion of a distributed application, the observability data indicating the first portion of the distributed application is degraded;
receiving a complete version of observability data produced by the first portion of the distributed application;
identifying other portions of the distributed application that are correlated with the first portion of the distributed application; and
causing an amount of observability data produced by the identified other portions of the distributed application to increase.

20. The computer-implemented method of claim 19, wherein identifying the other portions of the distributed application that are correlated with the first portion of the distributed application, includes:
evaluating a topological relationship between the portions of the distributed application; and
identifying a subset of the portions of the distributed application that are within a predetermined distance from the degraded first portion of the distributed application.

21. The computer-implemented method of claim 20, wherein causing the amount of observability data produced by the identified other portions of the distributed application to increase, includes:
sending one or more instructions to each portion of the distributed application in the identified subset, the one or more instructions causing the amount of observability data produced by the respective portion in the identified subset to increase.

22. The computer-implemented method of claim 20, wherein each portion of the distributed application is a microservice, wherein the topological relationship outlines how the microservices interact with each other.

23. The computer-implemented method of claim 22, wherein the operations are performed by a processing engine coupled to each of the portions of the distributed application.

24. The computer-implemented method of claim 19, comprising:
in response to receiving observability data indicating the first portion of the distributed application is not degraded:
receiving a condensed version of observability data from the first portion; and
causing the amount of observability data produced by the identified other portions of the distributed application to decrease.

25. A computer program product, comprising a computer readable storage medium having program instructions embodied therewith, the program instructions readable by a processor, executable by the processor, or readable and executable by the processor, to cause the processor to:
receive observability data associated with a first portion of a distributed application, the observability data indicating the first portion of the distributed application is degraded;
receive a complete version of observability data produced by the first portion of the distributed application;
identify other portions of the distributed application that are correlated with the first portion of the distributed application; and
cause an amount of observability data produced by the identified other portions of the distributed application to increase.

* * * * *